NORTON & OWEN.
Bark Mill.
No. 4,090.
Patented June 25, 1845.
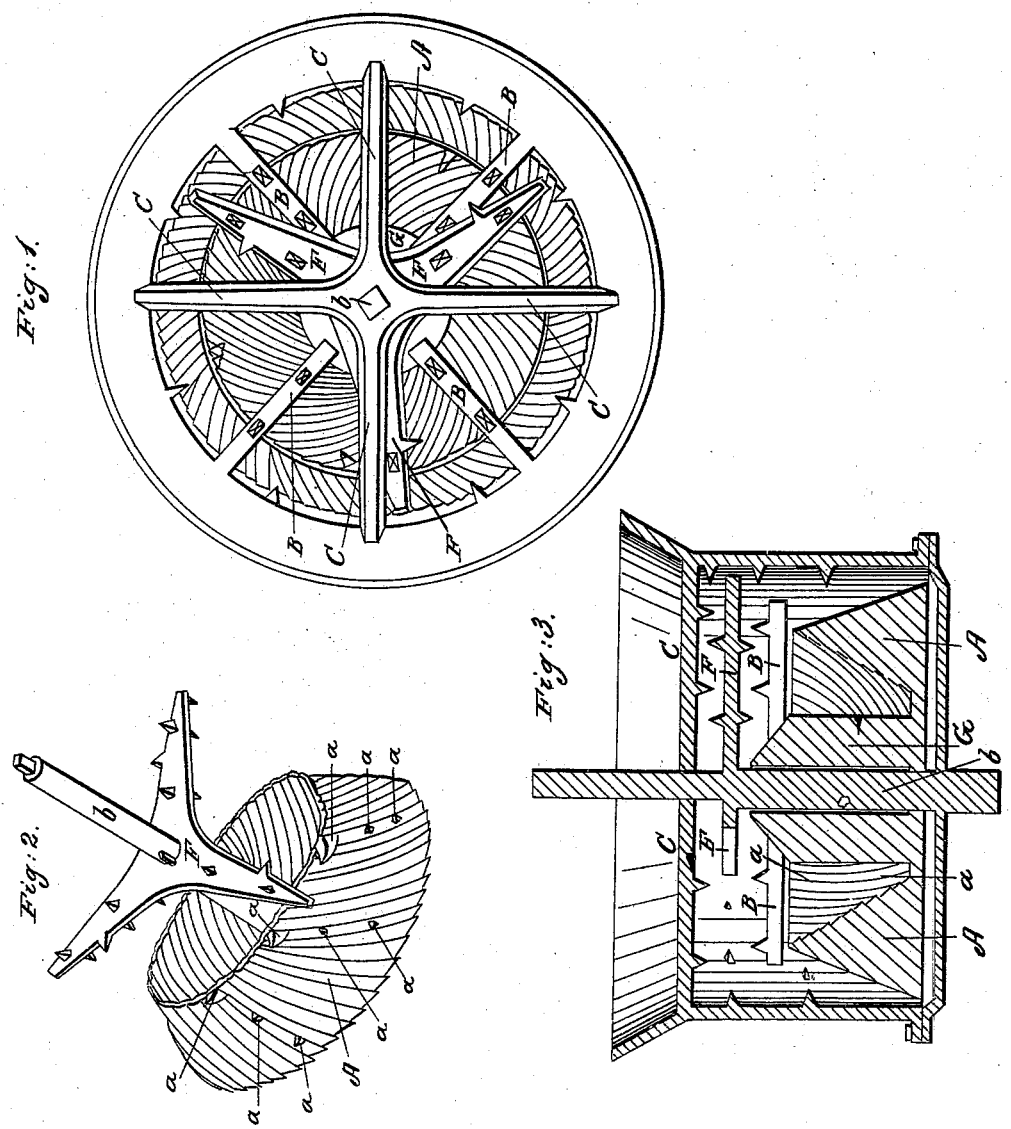

UNITED STATES PATENT OFFICE.

A. P. NORTON AND M. OWEN, OF SANGERFIELD, NEW YORK.

BARK-MILL.

Specification of Letters Patent No. 4,090, dated June 25, 1845.

*To all whom it may concern:*

Be it known that we, ANSON P. NORTON and MORRIS OWEN, of Sangerfield, in the county of Oneida and State of New York, have invented a new and useful Improvement in Constructing Mills for Grinding Bark and other Similar Substances; and we do hereby declare that the following is a full, clear, and exact description thereof, reference being had to the accompanying drawing, which forms a part of the same, in which—

Figure 1 is a plan of the mill complete. Fig. 2 a view of the nut, Fig. 3 a section of the curb and inner cone, &c.

The nature of our invention consists in constructing a mill of the following description.

In the annexed drawings A represents the nut of the mill, B the lower cross bar, and C the upper cross bar, between which the arms F on the shaft $b$ of the nut A revolve, as shown in Figs. 1 and 3. We place on the nut the teeth $a$, as represented in Fig. 2, inclining more or less from a perpendicular line, so as to give draft to the same, to facilitate the feeding of the mill. In constructing mills to run to the right or left, we place the teeth inclining alternately to the left and right, in both directions, on the nut for that purpose.

For the first breaking and preparing of the substance to be ground, we use the arms F above named, and the cross bars B, and C, after the manner represented on the mill.

The nut is annular, and grinds on both sides against the curb, and a core G, in the center, similar to the mill patented by M. Beecher. The core G is connected with the curb, by means of straight arms B, on the upper side of which there are coarse teeth; above these bars are others standing opposite the intervals between the lower ones as shown in Fig. 1, C, that extend across from one side of the curb to the other to which they are attached, and on the under side of them as seen in Fig. 3 are similar teeth to those on B. On the shaft of the nut are placed the horizontal arms F three in number more or less, these are armed with teeth above, below and on the sides, as shown in Fig. 2. Between the stationary bars and revolving arms the large pieces of bark are broken as they are fed into the machine, they then descend into the nut and are broken to a suitable size, to be readily ground which greatly facilitates the operation with a diminution of power.

Having thus described our machine and its improvements what we claim as our invention and desire to secure by Letters Patent is—

The combination of the bars B, and C, and the toothed arms F on the double-nut shaft running between the straight toothed bars B and C, with the bark mill constructed and arranged in the manner and for the purpose described.

A. P. NORTON.
MORRIS OWEN.

Witnesses:
J. J. GREENOUGH,
L. CALDWELL.